July 7, 1936.  G. E. ARMINGTON ET AL  2,047,051
SIDE DUMP VEHICLE
Filed Nov. 2, 1932   4 Sheets-Sheet 3

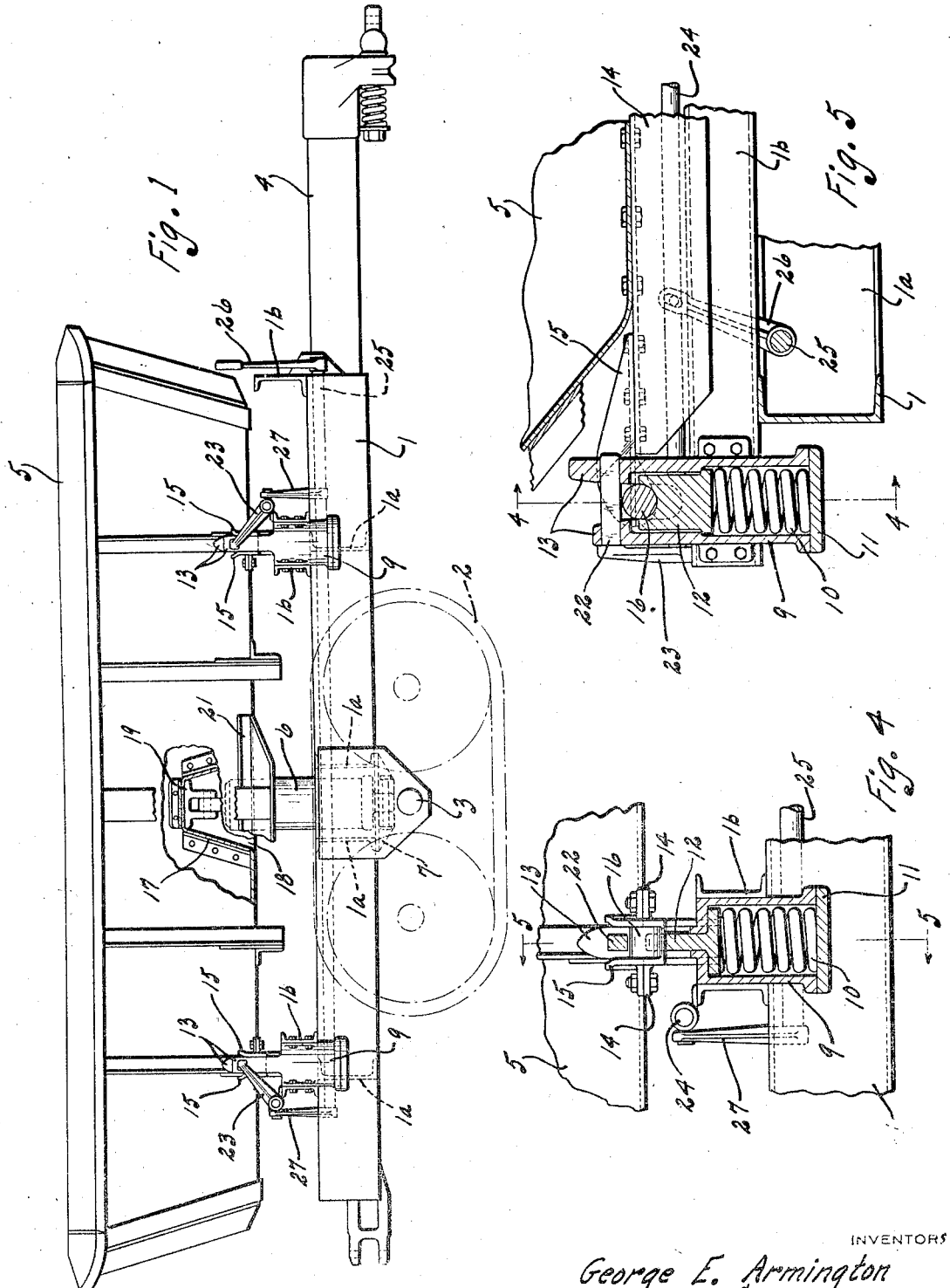

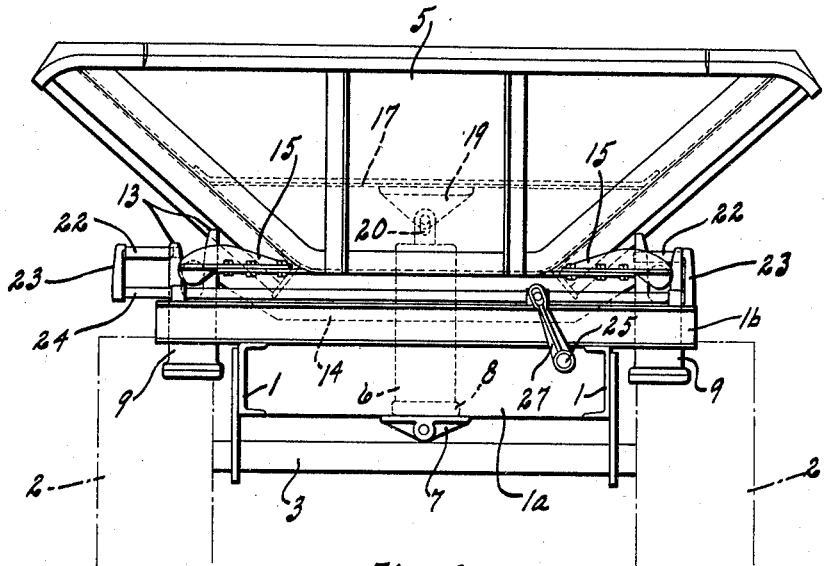
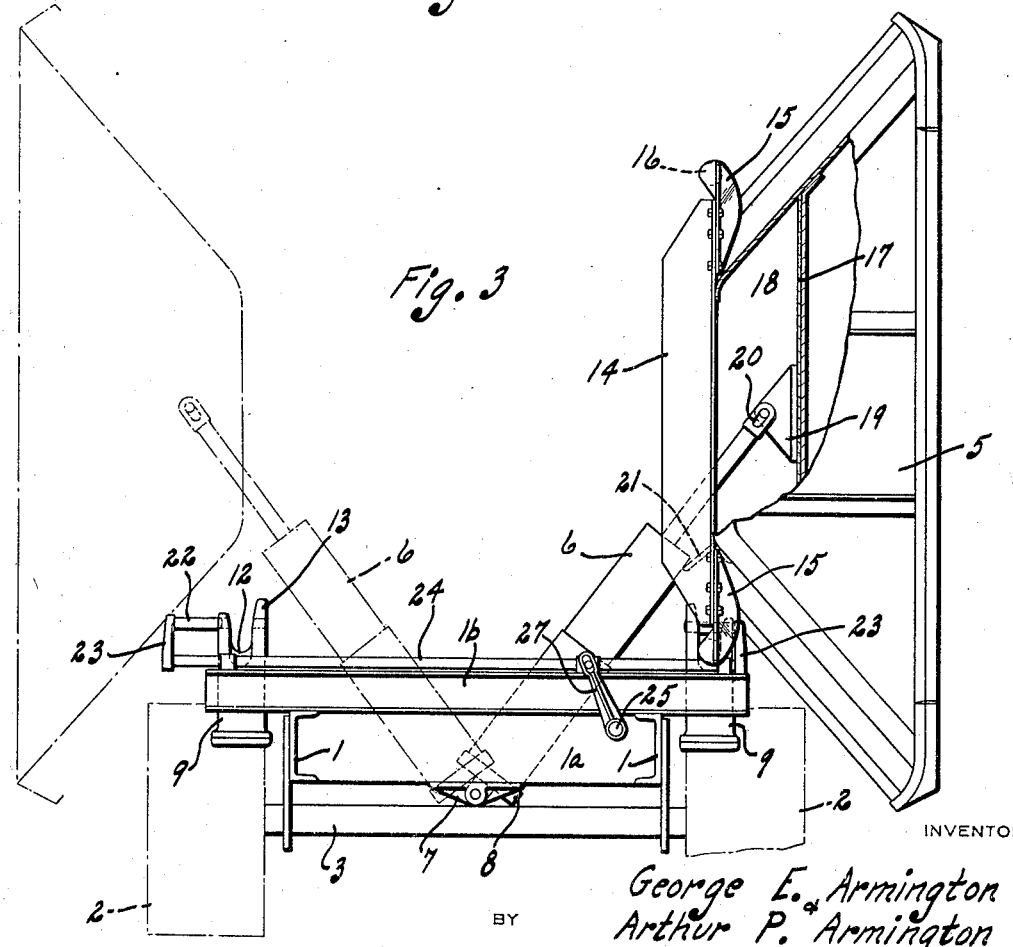

INVENTORS
George E. Armington
Arthur P. Armington
BY
Brockett, Hyde, Higley & Meyer
ATTORNEYS

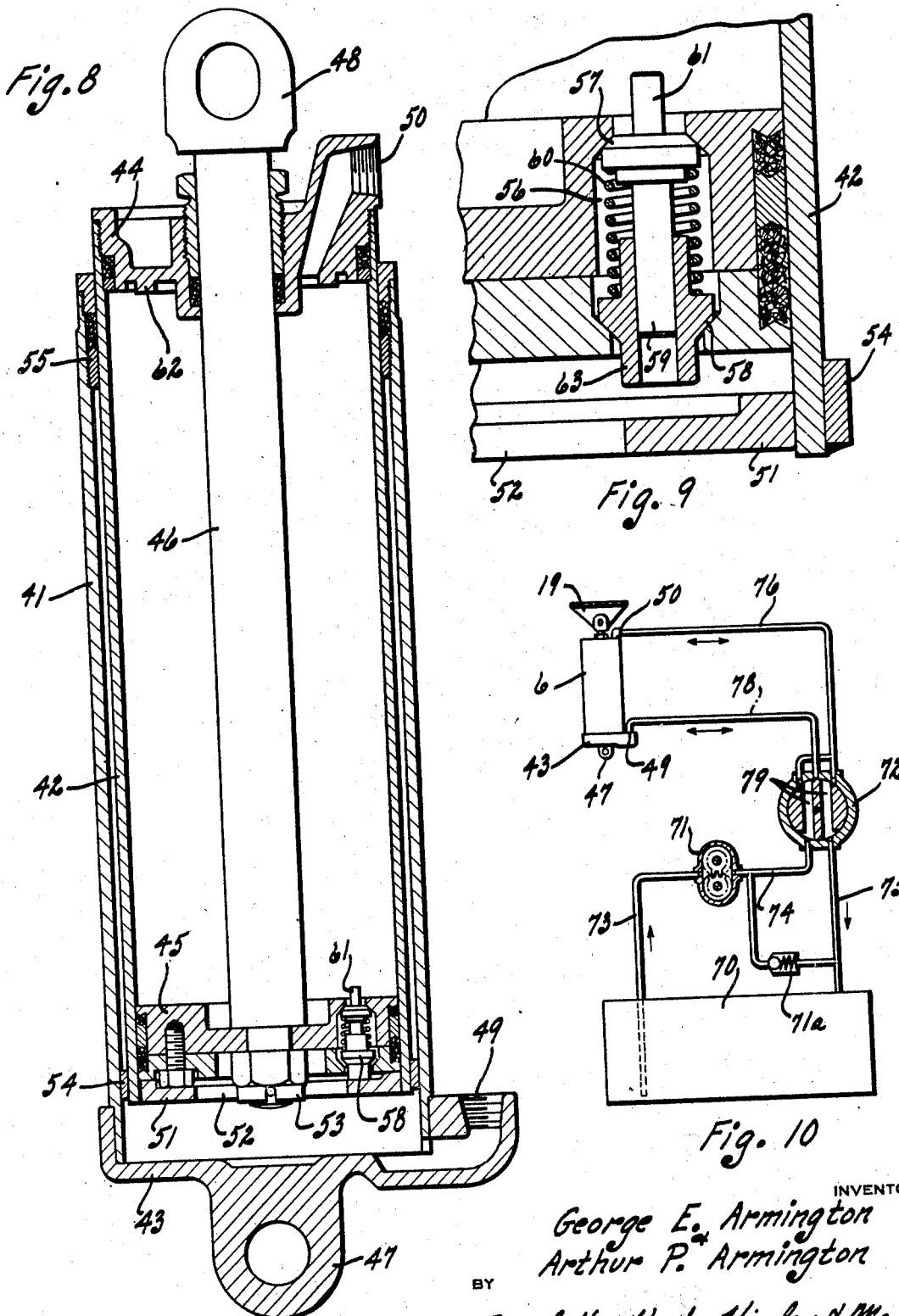

Patented July 7, 1936

2,047,051

UNITED STATES PATENT OFFICE 2,047,051

SIDE DUMP VEHICLE

George E. Armington, South Euclid, and Arthur P. Armington, Willoughby, Ohio, assignors to The Euclid Road Machinery Company, Euclid, Ohio, a corporation of Ohio Application November 2, 1932, Serial No. 640,872

19 Claims. (Cl. 298—18)

This invention relates to large, heavy-duty dumping vehicles, and the invention is particularly adapted to such vehicles of the cart type and arranged to dump by tilting of the load-carrying body to a side thereof, left, right or rear.

An object of the invention is to provide such a spring mounting of the body that rough loading thereof as by dropping large rocks thereinto, will least affect the other vehicle parts and particularly, when the vehicle is of cart type, the draft means to which the vehicle is hitched.

Another object of the invention is to combine selective dumping to one side or another, with the described spring mounting of the container body.

A further object of the invention is to provide such a motion to the body, in dumping, that even sticky loads therein will be freely discharged. This feature of the invention, as will appear, involves a novel arrangement providing tilting of the body through such a large angle that the body in dumping position is overbalanced from load-carrying position; and another object of the invention is to provide cooperative body actuating means whereby the body has novel load-discharging motion when in dumping position, and may be returned from dumping to load-carrying position.

Still another object is to provide the body with a recess for clearing its actuating means, and to arrange that the provision of the recess results in strengthening of the body.

Figure 6:
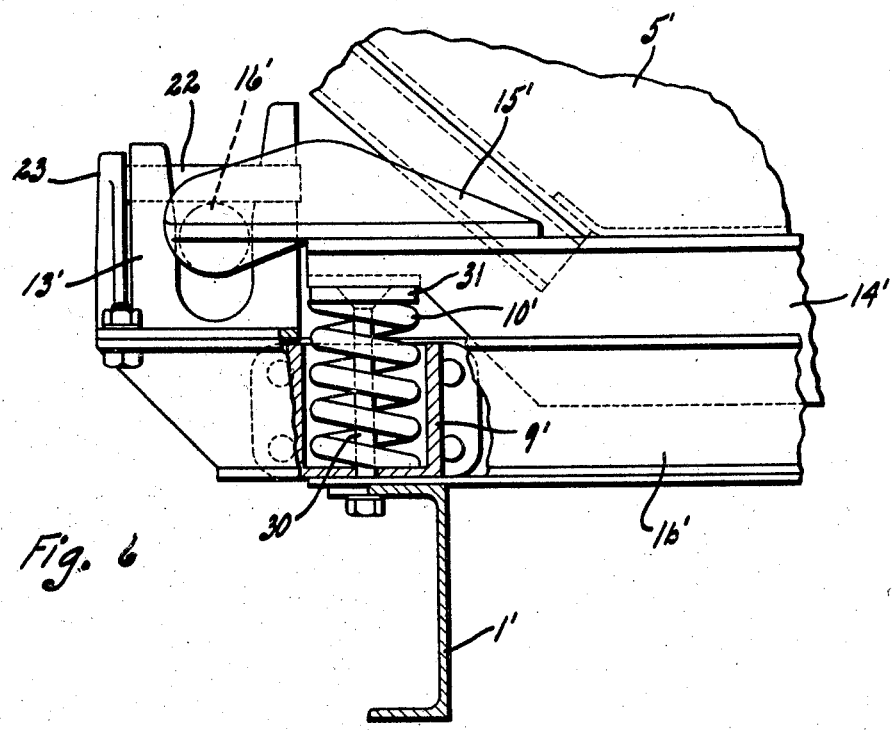
Figure 7:
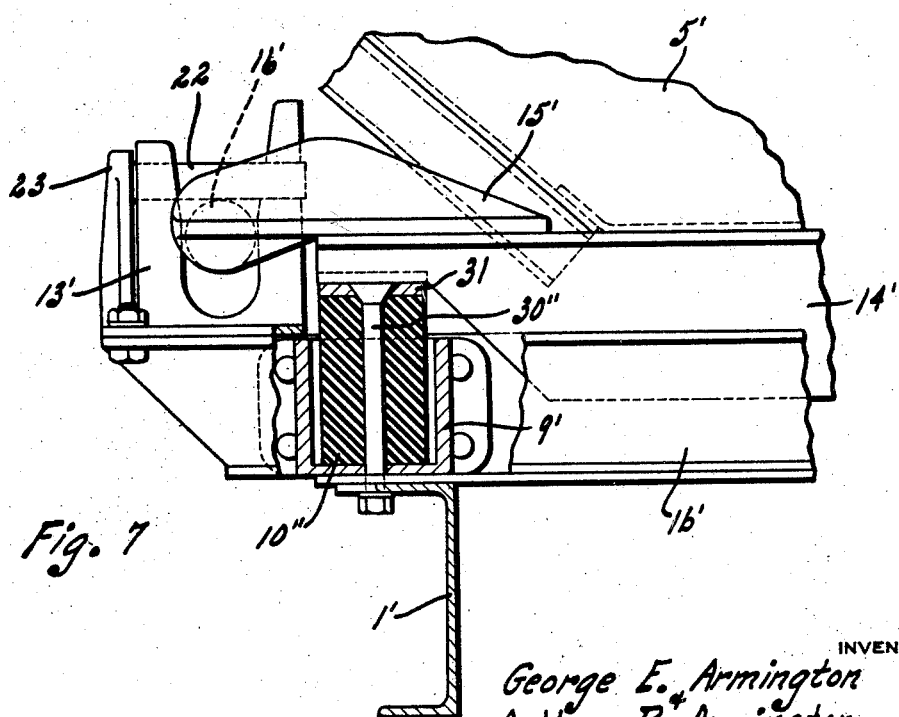

Numerous further objects and advantages will be apparent from the following description taken in connection with the accompanying drawings, in which Fig. 1 is a side elevation of a vehicle which forms an illustrative embodiment of the invention, parts being broken away to show details of construction, and running gear parts being conventionally indicated in broken lines; Figs. 2 and 3 are rear end elevations of the same, with the rear hitch illustrated in Fig. 1 removed, Fig. 2 showing the body in load-carrying position as it appears in Fig. 1, and Fig. 3 showing the body in full lines as in dumping position to one side, and in broken lines as in dumping position to the opposite side, parts being broken away to show details of construction; Figs. 4 and 5 are enlarged details of parts appearing in other figures, these details being generally in sectional elevation, the section of Fig. 4 being as in the plane of line 4—4, Fig. 5, and the section of Fig. 5 being as in the plane of line 5—5, Fig. 4; Fig. 6 is an enlarged detail, partly in section, corresponding to Fig. 5 but showing a modified arrangement of the spring means; Fig. 7 is a view similar to Fig. 6, illustrating the use of non-metallic spring means for the metallic spring means of Figs. 5 and 6; Fig. 8 is a view in longitudinal section of the jack employed, the parts being shown near retracted position, as shortly after commencement of extending operation, or near completion of retracting operation, the piston, however, being at the inner end of its stroke in its cylinder; Fig. 9 is an enlarged detail of the piston valve and associated parts appearing in Fig. 8, but the parts being shown with the piston in an intermediate part of its stroke in its cylinder; and Fig. 10 is a diagrammatic view showing the jack actuating arrangement.

With reference now to Figs. 1 to 5 of the drawings, the vehicle illustrated is of cart type. It has a rectangular frame generally indicated at 1, of structural members, the frame being supported upon its running gear—conventionally indicated at 2 as of the well-known crawler type of wheel substitute—by any convenient mounting means including a single axle 3 whereby the frame is free to tilt upon the crawlers about the axle 3 as a transverse axis. A drawbar 4 extends forwardly from the frame, to which it is rigidly attached and by which the vehicle may be hitched to the tractor or other draft appliance by which the vehicle is to be drawn. The function of the rigid drawbar, when coupled to the draft appliance, is to secure the frame against tilting upon its single axle 3 as well as to cause the frame to follow the draft appliance. A load-carrying body 5 is supported upon the frame in a position to be substantially balanced over the axle 3, by spring means as will appear. The body 5 also has connection with the frame 1 by means including a jack 6 for controlling the dumping actuation of the body, as will also more fully appear.

The parts thus far described comprise the principal parts of the vehicle.

More particularly, the frame comprises a pair of side members 1 joined by a number of transverse members 1a in the plane of the side members, some of the members 1a being located adjacent the axle 3 to carry a bracket 7 on which the base 8 of the jack 6 is pivotally supported, the jack extending between these frame members 1a. The frame also includes a number of transverse members 1b overlying the side frame members 1 and extending therebeyond. These members 1 include paired ones between the projecting ends of which, beyond the side members, are mounted cylindrical brackets 9; there being a pair of these brackets on each side of the vehicle where side dumping is to be provided. Within the hollow of each bracket 9 is located resilient means here shown as a compression spring 10 of coil type, a plate 11 being arranged to close the lower end of the bracket and thus secured to support the spring. Within the hollow of the bracket and resting upon the upper end of the spring 10 is the head part of a plunger 12 which extends upwardly through a slot-like opening in the upper end of the bracket and terminates at its upper extremity with a saddle or recessed seating face. The bracket 9 also extends upwardly beyond its cylindrical part, where it is forked as indicated at 13 to provide a guide to the saddle part of the plunger 12. The inner one of the upstanding fork ends extends above the other one as indicated Fig. 5, and is sharpened as indicated Fig. 4, for a purpose which will appear. The parts are so arranged that the saddle recesses on each side of the frame will be aligned to locate a longitudinal axis generally along the vehicle side, within the saddle recesses of the plungers 12, and the crotches of the bracket forks 13 are elongated downwardly, as indicated Figs. 2, 3 and 5, to permit downward motion of the plungers 12 against the springs 10.

The body 5 has a bottom wall considerably narrower than the frame, with side walls extending from the bottom wall upwardly and outwardly beyond the frame, and end walls which may also slope as indicated. The body is reenforced by structural members located on the outside of its walls, as indicated. These structure members include some extending around beneath the body from edge to edge. These members include pairs of straight angle irons or similar members 14 secured to the bottom wall of the body and extending therebeyond and there carrying brackets 15. Each bracket 15 has a pair of arms extending beyond its supporting means 14 and carrying a cylindrical pin part 16 bridging between the bracket arms and adapted to rest upon the saddle of the corresponding plunger 12; the parts being so proportioned and arranged that one of the brackets 15 thus cooperates with each of the four plungers 12. The body 5 is thus supported at four points, each upon one of the springs 10, which springs are thus effective between the body and the frame of the vehicle.

The sides of the body are also connected by reenforcing means 17 of inverted U-section transversely extending between the body side walls to provide a transversely extending recess 18 opening downwardly below the body. Centrally within this recess is secured a bracket 19 to which the upper end of the jack 6 has pivotal connection as indicated, the connection including a slot 20 providing a limited amount of lost motion between the parts. As indicated Fig. 2, this lost motion permits vertical motion of the body upon its supporting springs without effect upon the jack. Reenforcing members 21 are arranged at the sides of the body to bridge across the ends of the recess 18. It will be evident that the weight of the body in load-carrying position is carried by all of the springs 10, and that the body may tilt sideways upon the pair of pins 16 of either side.

Means are provided for selective control of the side to which dumping is desired. Each fork 13 of socket member 12 is provided with openings to receive latch means in the form of a tongue part 22 of a bracket 23 carried on the corresponding end of a transversely extending rod 24 which constitutes adjusting means interconnecting opposite latch means, the rods 24 being suitably mounted for sliding motion to insert or withdraw the tongues 22 with respect to their forks 13. The parts are so proportioned and arranged that, as illustrated in Figs. 2 and 3, when the rods 24 are at one extreme position the tongue 22 at one end of the rod 24 will be inserted in its bracket fork, as indicated Fig. 4, while the tongue at the other end of the rod will be withdrawn from the mouth of its bracket fork. That the two rods 24 may have coincidental adjustment, a longitudinally extending rock shaft 25 controlled by a hand lever 26 carries a pair of levers 27, each lever 27 having actuating connection with one of the rods 24 as indicated. It will be apparent that the arrangement is such that, when the control lever 26 is thrown to the left, to move the actuating levers 27 correspondingly, all four of the tongues 22 will be shifted to the left, so that the body 5 will be free to tilt to the right, upon the two right-hand pins 16 which will act as hinge pins. Obviously, upon shifting the control lever 26 in the opposite direction, the body will be free to tilt to the left, the tongues 22 acting as latch means as before except that now the left-hand pins 16 are confined in their sockets and the right-hand pins are released.

The jack has a long lift, sufficient to move the body from its load-carrying position to the dumping position indicated Fig. 3, and as will appear the jack has double-acting characteristics. It is also so provided that the jack cannot extend beyond the length indicated Fig. 3 and preferably has an automatic power cutoff when extended to its limit. As usual in the art, the jack is a hydraulic one and receives its actuating fluid from an external source, such as from a pump located on and driven from the tractor to which the vehicle is hitched, the connections between pump and jack being arranged for control by the tractor operator.

Obviously, when the body is in load-carrying position it rests stably on the frame supported by the described spring means.

The parts are so proportioned and arranged that the body has a large angle of tilt from load-carrying position, so that the load may be freely and quickly discharged. When the body is in extreme dumping position as at the right, shown in full lines Fig. 3, it is consequently overbalanced, away from load-carrying position. Its dumping movement is limited, as by the jack, so as to clear the crawler 2, on the near side.

Operation will be as follows, assuming the body in load-carrying position as indicated Figs. 1 and 2. When the body is being loaded, if a large mass be dropped thereinto, as for example a large rock dropped from a power shovel, the spring means serve to cushion the frame and rigidly associated parts from the shock, which is thus effectively isolated at the body itself. Suppose the mass to be dropped into the body ahead or rearward of the axle 3, the spring means on that side of the axle serve also to prevent the shock from being transmitted with full effect through the frame and drawbar to the tractor to which the vehicle is hitched, the large mass of these parts thus being available to dampen the vertical stresses which would otherwise be directly imposed on the tractor.

Suppose now the load is to be dumped, the control lever 26 and associated parts being for example shifted to the left as in Figs. 2 and 3 for dumping to the right. Upon application of fluid power to the jack 6 the upper end of the jack is caused to extend, bearing upwardly upon the body, against the bracket 19, as soon as the lost motion at 20 is taken up. Since the left side of the body is free and the hinge pins 16 at the right side are confined by the tongues 22, the body tilts in clockwise direction about the right-hand hinge pin axis. As the jack extends and the body tilts, some of the load will usually be discharged from the body, but ultimately, after the body is substantially raised, it reaches a position wherein it, together with the remainder of its load, as a single mass, is balanced over its tilting axis. Thereupon its inertia causes this mass to advance ahead of the jack which is relatively slow moving at substantially constant speed. The body takes up the lost motion at 20 and drops or falls over quickly to the extreme dumping position, limited by the jack, which meanwhile may have attained the end of its travel but at least has the effect of a substantially dead or fixed stop. This sudden dropping body action with substantially all of the body weight and that of the remaining load upon the right-hand spring means, causes these springs to very appreciably yield. The result is a shake or jog of the body which serves effectively to discharge therefrom any load which would otherwise tend to stick.

After the load is thus dumped, and when the operator reverses the power on the jack to cause it to retract, the body immediately moves from dumping position, in counter-clockwise direction Fig. 3. As the body passes its position of balance over its hinge axis, the lost motion at 20 is again reversed by the body advancing ahead of the jack, but the jack continues its lowering motion and ultimately the body is returned to its load-carrying position. The jack, however, may continue to the position indicated Fig. 2, again reversing the lost motion at 20 and relieving the jack from the body weight.

Where dumping at the left is desired, the control lever 26 is simply thrown in the opposite direction before admission of power to the jack, in which event the body will move to the left-hand broken line dumping position instead of as formerly described to the right. Obviously, the body will have the same load-discharging jogging motion equally as before, and will be returned to load-carrying position as before; the jack swinging in either direction about its lower end mounting pin in the bracket 7 dependent merely upon the setting of the control lever 26.

While I have illustrated and described an arrangement for dumping at either lateral side it will be apparent that the body could as well be arranged to dump at the rear side, with the same load-clearing jogging action as heretofore described.

With reference now to Fig. 6, by comparison with Fig. 5 it will be apparent that the illustration is of a modification wherein the spring 10' is located toward the body 5' with respect to the seat in the saddle bracket 13' for the pin 16' of the bracket 15'. The bracket 15' is secured, as before, on the transverse members 14' extending beneath and beyond the body 5'.

The channel iron 1' here supports the transverse frame members 1b' as before, and a bracket 9' is placed over the side frame member 1' and between the pair of transverse members 1b'. The bracket 9' has a hollow as indicated, to receive the spring 10', the spring being positioned by a bolt 30 carrying at its upper end a plate 31 and its lower end passing loosely through openings in the bracket 9' and upper flange of the frame member 1'. The plate 31 is of course arranged to provide bearing for the members 14' which are suitably formed as indicated to bear upon the plate. The frame members 1b' extend outwardly beyond the spring 10' to locate the saddle bracket 13' with its seat for the hinge pin 16' in the same position as before.

The spring strength is such that the body, in load-carrying position, will normally be supported on the frame wholly by the springs. However, with the arrangement of Fig. 6, as the body is tilted to dump the hinge pins 16' on the side toward which dumping is had, seat in their saddle brackets 13', the body no longer resting upon any of the springs. Discharge of the load is still promoted by the large angle of tilt of the body to an over-balanced position, and by the action of the lost motion in the jack connection, all as before.

The modification of Fig. 7 is identical with that of Fig. 6 with the exception that in place of the metallic coil spring 10' of Fig. 6, a block 10" of non-metallic resilient material such as live rubber is substituted. The rubber block 10" thus yieldably supports the body on the frame, when the body is in load-carrying position, just as the spring 10' does in the modification of Fig. 6. The rubber block 10" is maintained in position by the bolt 30" passing through a central opening in the block, the block being preferably of cylindrical form and its bolt-receiving opening being preferably axial thereof as will be appreciated.

In the arrangement of Fig. 7 operation will be identical with that of the arrangement of Fig. 6.

With reference now to Figs. 8 and 9, the jack is shown. In the jack, which has heretofore been generally indicated by the reference character 6, 41 is an outer cylinder and 42 an inner cylinder cooperative therewith in telescopic relation. The outer cylinder has a head 43 and the inner cylinder a head 44 there opposite. 45 is a piston cooperative with the inner cylinder 42 and having a piston rod 46 bearing in the cylinder head 44, which head has the usual stuffing box indicated, for the purpose. The head 43, as at 47, is provided with means by which that end of the jack assembly may be mounted on the bracket 7 of the vehicle, and the piston rod 46, on its outer end as at 48, is provided with the elongated opening shown whereby that end of the jack assembly may have the described lost motion connection, heretofore indicated by the reference character 20, with the bracket 19 on the body 5. An end connection 49 is provided for the head end of the large end cylinder 41, and similarly an end connection 50 is provided for the head end of the small end cylinder 42. The small end cylinder 42 is provided, at its inner end, with an inwardly extending flange 51 by which the piston 45 is retained in the cylinder, leaving a large central opening 52 communicating between the hollows of the cylinders 41 and 42, and providing clearance for the nut 53 by which the piston 45 and its rod 46 are secured together.

It will be apparent that, commencing with the parts in retracted position, the connection 50 being open, fluid pressure applied through the connection 49 will cause extension of the parts, the piston and its cylinder 42 moving outwardly together as a unit until the cylinder 42 attains the outer end of its stroke in its cylinder 41; this motion being limited by engagement of the flange 54 which is secured on the cylinder 42, with the flange 55 which is secured on the cylinder 41. The cylinder 42 is caused to move outwardly by the pressure effective upon its annular sectional area, while the same pressure is effective upon the piston, by way of the opening 52 in the end of the cylinder 42. Thereafter, the fluid pressure being maintained, the piston will continue its motion until it abuts the head 44 of its cylinder, whereupon the parts are in fully extended relation. The extending operation thus is one involving two stages, first wherein the cylinder 42 is motionless with respect to the piston, and second, one wherein the cylinder 42 is motionless with respect to its cylinder 41.

Commencing with the parts in fully extended position, the connection 49 being open and pressure being applied through the connection 50, the piston will be caused to move through its full stroke in its cylinder 42 before any movement of the cylinder 42 takes place. This is the first stage of the retracting operation, and suffices to move the body 5 into a position wherein it is balanced toward load-carrying position. Thereafter the piston and its cylinder 42 may be caused to move inwardly of the cylinder 41, by the weight of the body 5 applied to the jack effective through its end connections 47 and 48.

It will be observed therefore that the jack has double acting characteristics in so far as the piston and its cylinder 42 are concerned and has single acting characteristics in so far as the piston-cylinder 42 unit with respect to the cylinder 41 is concerned. The cylinders 41 and 42 together comprise a telescopic series, the piston cooperating with the small end cylinder of the series with the usual piston and cylinder relation.

Means are provided whereby pressure applied to the piston is automatically terminated, within the jack itself, when the piston attains the end of its stroke in its cylinder in either direction. To this end the piston is provided with a through opening 56 in which a pair of valves 57 and 58 are arranged to seat in opposite directions. These valves are of poppet type, the valve 57 having a stem 59 bearing in the valve 58, and about which stem is arranged a compression spring 60 whereby both valves are yieldably maintained against their seats. The valve 58 is provided with a post 61 extending beyond the piston and adapted to engage the head 44 slightly before the piston attains the outer end of its stroke, an annular ring 62 or other equivalent means being provided on the cylinder head 44, if necessary for the purpose. The valve 58 is similarly extended as at 63 to provide a post engageable with the flange 51 of the cylinder 42 shortly before the piston attains the inner end of its stroke in the cylinder 42. It will be observed that the function of each of the posts 61, 63, is to unseat its valve at the end of one of the piston strokes.

Operation of the jack will be as follows, assuming the parts in fully retracted position, the connection 40 open and pressure applied through the connection 49, the valve 58 being unseated by engagement of its post 63 with the flange 51 as shown in Fig. 8. The valve 57 being seated, the pressure is effective upon the piston as though the piston had no opening. The jack parts are thus caused to move to extended relation as above described. As the piston attains the outer end of its stroke the post 61 engages the cylinder head 44 unseating the valve 57, and the valve 58 being unseated by the fluid pressure against the piston, a bypass through the piston by way of the opening 56 is had. Thus, continued pressure applied at the connection 49 is ineffective upon the parts to strain them, flow being permissible outwardly through the connection 50.

Upon reversing the conditions at the connections 49 and 50, by application of pressure at the connection 50 and relief at the connection 49, the pressure then becomes effective to seat the valve 58 so that again the piston acts as the usual piston and is caused to move inwardly. As the piston attains the inner end of its stroke in its cylinder 42 the valve 58 is unseated by engagement of its post 63 with the cylinder flange 51, as shown Fig. 8. Flow is thereupon had through the bypass opening 56, unseating the valve 57 and passing into the cylinder 41 through the opening 52 in the cylinder 42.

With reference now to Fig. 10, the actuating and controlling arrangement for the jack appear, conventionally indicated. 70 is a supply tank for the fluid by which the jack is to be actuated. 71 is a pump and 72 a valve. These parts are usually and preferably located upon the tractor by which the vehicle is to be drawn, the pump 71 being continuously driven by the tractor motor, and the valve 72 being located for convenient control by the tractor operator. The pump is driven to deliver from the tank 70 to the valve by way of pipes 73 and 74 respectively and a pipe 75 leads from the valve back to the tank 70. 71a indicates the usual bypass relief including a spring loaded safety valve, by which the parts are protected against overloading by excessive fluid pressures.

76 indicates a flexible connection leading from the jack connection 50 to the valve 72 at two places in the housing of the latter, and 78 is a flexible connection leading from the jack connection 49 to the valve 72.

The valve is essentially a two-way valve arranged to accommodate the uni-directional flow on its pump-tank side as indicated by the single-headed arrows, and to produce flow on its jack side in either of the two directions indicated by the double-headed arrows. The valve itself consequently has the two passages indicated at 79. The valve is shown as in a theoretical neutral position from which it may be rotatably moved in opposite directions to either of two operating positions.

If turned to the right from the position shown it will provide communication from the pump to the jack connection 49, by way of the passages 74, the left-hand passage 79 and the passage 78 respectively. At the same time it will provide a relief passage from the jack connection 50 back to the tank 70 by way of the pipe 76, right-hand passage 79 and pipe 75 respectively. Thus the jack will be caused to open. On the other hand, if the valve be moved in the opposite direction to its other operating position, it will provide communication from the pump to the jack connection 50 by way of the passages 74, left-hand passage 79, and passage 76 respectively. At the same time it will provide a relief passage from the jack connection 49 back to the tank 70 by way of the pipe 78, the right-hand passage 79 and pipe 75 respectively. Thus the jack will be caused to close.

In either event once the valve be set to cause actuation of the jack in either direction, once the jack has completed its power operation the described bypass will be provided therein so that the operator need give no further attention to the valve than merely to set it to initiate the desired operation. In practice the valve therefore need have no neutral position but instead may be arranged to be set in either of two positions only, one for jack opening and the other for jack closing; by which arrangement it will be observed that control is much simplified from the viewpoint of the operator, and the entire fluid-handling mechanism is prevented from overloads by the described valve means in the piston of the jack.

What we claim is:

1. In a vehicle of the class described, a frame, spring means at one side thereof, a load-carrying body mounted for movement between a load-carrying position wherein the body has partial support on the frame by said spring means, and a dumping position wherein the body tends to move from load-carrying position and is substantially wholly supported by said spring means, and means connecting said frame and body for and controlling said movement of the latter and including a jack adapted to cause said body movement in either direction, said connecting means also including a lost motion connection permitting a limited amount of free body movement.

2. In a vehicle of the class described, a frame, spring means at a side thereof, a load-carrying body mounted for movement between a load-carrying position wherein the body has partial support on the frame by said spring means, and a dumping position wherein the body is substantially wholly supported by said spring means, and means for controlling said body movement and including means providing a sudden motion of said spring means as said body attains said dumping position.

3. In a vehicle of the class described, a frame, spring means at a side thereof, a load-carrying body mounted for movement between a load-carrying position wherein the body has partial support on the frame by said spring means, and a dumping position wherein the body is substantially wholly supported by said spring means, and means for controlling said body movement and including means providing a sudden yield of said spring means as said body attains said dumping position.

4. In a vehicle of the class described, a frame, spring means at a side thereof, a load-carrying body mounted for movement between a load-carrying position wherein the body has partial support on the frame by said spring means, and a dumping position wherein the body is substantially wholly supported by said spring means, and means for controlling said body movement and including means permitting a sudden motion of said spring means as said body attains said dumping position.

5. In a vehicle of the class described, a frame, spring means at a side thereof, a load-carrying body mounted for movement between a load-carrying position wherein the body has partial support on the frame by said spring means, and a dumping position wherein the body tends to move from load-carrying position and is substantially wholly supported by said spring means, and means for controlling said body movement and including means providing a sudden stop of said body as it attains said dumping position, whereby upon said attainment said spring means will yield with resulting load-loosening body motion.

6. In a vehicle of the class described, a frame, a load-carrying body and spring means at a side of the parts and effective therebetween, said body being mounted for pivotal movement generally about said spring means between a load-carrying position, and a dumping position wherein the body is substantially wholly supported by said spring means, said positions being in opposite directions from an intermediate position wherein the body is in balance over said spring means, and means for controlling said body movement and including means providing a sudden stop to the pivotal movement of said body as it attains said dumping position.

7. In a vehicle of the class described, a frame, spring means at a side thereof, a load-carrying body mounted for movement between a load-carrying position wherein the body has partial support on the frame by said spring means, and a dumping position wherein the body tends to move from load-carrying position and is substantially wholly supported by said spring means, and means connecting said frame and body for actuating the latter between said positions and including a lost motion connection permitting a limited amount of body movement independent of said actuating means.

8. In a vehicle of the class described, a frame, a load-carrying body and spring means at a side of the parts and effective therebetween, said body being mounted for pivotal movement generally about said spring means between a load-carrying position, and a dumping position wherein the body is substantially wholly supported by said spring means, said positions being in opposite directions from an intermediate position wherein the body is in balance over said spring means, and means connecting said frame and body for actuating the latter between said positions and including a lost motion connection permitting a limited amount of body movement independent of said actuating means.

9. In a vehicle of the class described, a frame, a load-carrying body having a bottom wall narrower than said frame and side walls extending upwardly and outwardly from said bottom wall to overhang the sides of said frame, spring means at the sides of the frame beneath said body side walls and means mounting said body on said spring means to permit dumping motion of the body to either side upon an axis lying in the angle between the frame and the corresponding body side wall.

10. In a vehicle of the class described, a frame, a load-carrying body mounted thereon for pivotal movement between a load-carrying position over the frame and a dumping position at a side thereof, means for causing actuation of the body between said positions, and spring means associated with the opposite side of said frame to have supporting effect upon the body in said load-carrying position only.

11. In a vehicle of the class described, a frame, a load-carrying body mounted thereon for movement between a load-carrying position wherein the body is stable on the frame, and an overbalanced dumping position wherein the body tends to move from load-carrying position, and multiple stage hydraulic jack means connecting the parts for actuating said body, said jack means having a double acting stage whereby the body may be moved from said dumping position to one from which the body will be caused by gravity to move to said load-carrying position.

12. In a vehicle of the class described, a frame, a load-carrying body mounted thereon for movement between a load-carrying position wherein the body is stable on the frame, and an overbalanced dumping position wherein the body tends to move from load-carrying position, and multiple stage jack means connecting the parts for actuating said body, said jack means having a double acting stage whereby the body may be moved from said dumping position to one from which the body will be caused by gravity to move to said load-carrying position, said jack means being of fluid-actuated type and including means for automatically relieving actuating pressure on its parts upon termination of the completion of a working stroke of its double acting stage.

13. In a vehicle of the class described, a frame, a load-carrying body mounted thereon for movement between a load-carrying position wherein the body is stable on the frame, and an overbalanced dumping position wherein the body tends move from load-carrying position, and multiple stage jack means connecting the parts for actuating said body and comprising a plurality of cylinders arranged for cooperation in a telescopic series and including heads closing the ends of said series, a piston arranged for cooperation with the small end cylinder and having a piston rod bearing in the head thereof, an end connection for the large end cylinder whereby said parts may be caused to move from retractile to extending relation, and an end connection for the small end cylinder whereby the piston rod may be caused to move from extending to retracting relation therewith, said jack means being so associated with said body that jack extension causes body movement from said load-carrying position and body movement toward load-carrying position will cause retraction of the jack.

14. In a vehicle of the class described, a frame, a load-carrying body mounted thereon for movement between a load-carrying position wherein the body is stable on the frame, and an overbalanced dumping position wherein the body tends to move from load-carrying position, and multiple stage jack means connecting the parts for actuating said body and comprising a plurality of cylinders arranged for cooperation in a telescopic series and including heads closing the ends of said series, a piston arranged for cooperation with the small end cylinder and having a piston rod bearing in the head thereof, connections for said cylinder series for admission of pressure to the opposite faces of said piston, and cooperative means associated with said piston and its cylinder respectively for automatically bypassing said piston at the ends of the piston strokes in said cylinder.

15. In a vehicle of the class described, a frame, a load-carrying body mounted thereon for movement between a load-carrying position wherein the body is stable on the frame, and an overbalanced dumping position wherein the body tends to move from load-carrying position, spring means effective between said frame and said body, and means connecting said frame and body for controlling said movement of the latter and including a jack adapted to cause said body movement in either direction, said connecting means also including a lost motion connection permitting a limited amount of said body movement independent of said jack.

16. In a vehicle of the class described, a frame, a load-carrying body mounted thereon for movement, when said frame is normally disposed, generally about a side of said frame between a load-carrying position wherein the body is stable on the frame, and an overbalanced dumping position wherein the body tends to move from load-carrying position, said body having an intermediate position wherein it is balanced unstably over said frame side, and means interconnecting said frame and body for controlling said movement of the latter and including a lost motion connection, whereby the lost motion of said connection will be taken up by said body as the latter progresses through its said balanced position, with resulting jar to the load in the dumping movement of the body.

17. In a vehicle of the class described, a frame, a load-carrying body and spring means at a side of the parts and effective therebetween, said body being mounted for pivotal movement generally about said spring means between a load-carrying position, and a dumping position wherein the body is substantially wholly supported by said spring means, said positions being in opposite directions from an intermediate position wherein the body is in balance over said spring means, and double-acting jack means connecting said frame and body for actuating the latter between said positions and including a lost motion connection permitting a limited amount of body movement independent of said actuating means.

18. In a vehicle of the class described, a frame, a load-carrying body, spring means arranged to yieldably support said body on said frame, said body being mounted to tilt for dumping, and means interconnecting said frame and body and including a jack disposed generally upright benear the body for dumping actuation thereof and a lost motion connection between the body and the jack effective to permit depression of said body with yield of said spring means, without affecting said jack.

19. In a vehicle of the class described, a frame, a load-carrying body mounted thereon for movement, when said frame is normally disposed, between a load-carrying position wherein the body is disposed over and stably supported upon the frame, and an overbalanced dumping position wherein the body is slopingly disposed at a side of the frame and tends to move from load-carrying position, said body thus having a position of balance in unstable equilibrium between its said load-carrying and dumping positions, and jack means adapted to adjust said body from load-carrying through balancing position, and back to load-carrying position, and including a lost motion connection providing a sudden stop for body movement to dumping position.

GEORGE E. ARMINGTON.
ARTHUR P. ARMINGTON.